(12) United States Patent
Zhu et al.

(10) Patent No.: US 9,013,536 B2
(45) Date of Patent: Apr. 21, 2015

(54) AUGMENTED VIDEO CALLS ON MOBILE DEVICES

(71) Applicant: Futurewei Technologies, Inc., Plano, TX (US)

(72) Inventors: Fengqing Zhu, Sunnyvale, CA (US); Fengjun Lv, Sunnyvale, CA (US); Pengwei Wang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 151 days.

(21) Appl. No.: 13/801,946

(22) Filed: Mar. 13, 2013

(65) Prior Publication Data

US 2014/0267583 A1 Sep. 18, 2014

(51) Int. Cl.
*H04N 9/74* (2006.01)
*H04N 7/14* (2006.01)
*H04N 19/21* (2014.01)

(52) U.S. Cl.
CPC .................................... *H04N 19/21* (2014.11)

(58) Field of Classification Search
CPC ....... G06T 7/0081; G06T 7/0083; G06T 7/20; G06K 9/00771; G06K 9/36; H04N 5/225; H04N 5/262
USPC ............ 348/14.01, 14.02, 14.03, 14.08, 14.1, 348/14.12, 14.14, 14.07, 586, E07.078
See application file for complete search history.

(56) References Cited

U.S. PATENT DOCUMENTS

| | | | | |
|---|---|---|---|---|
| 8,588,518 | B2 * | 11/2013 | Wang et al. | 382/159 |
| 8,682,063 | B2 * | 3/2014 | Wang et al. | 382/164 |
| 8,873,812 | B2 * | 10/2014 | Larlus-Larrondo et al. | 382/118 |
| 2004/0001220 | A1 | 1/2004 | Gorday et al. | |
| 2004/0032906 | A1 * | 2/2004 | Lillig | 375/240.08 |
| 2009/0207269 | A1 | 8/2009 | Yoda | |
| 2010/0226566 | A1 * | 9/2010 | Luo et al. | 382/164 |
| 2012/0327172 | A1 * | 12/2012 | El-Saban et al. | 348/14.02 |
| 2013/0129156 | A1 * | 5/2013 | Wang et al. | 382/107 |
| 2013/0242095 | A1 * | 9/2013 | Lipton et al. | 348/143 |
| 2014/0037198 | A1 * | 2/2014 | Larlus-Larrondo et al. | 382/159 |
| 2014/0063275 | A1 * | 3/2014 | Krahenbuhl et al. | 348/208.4 |
| 2014/0119642 | A1 * | 5/2014 | Lee et al. | 382/159 |

FOREIGN PATENT DOCUMENTS

| | | |
|---|---|---|
| CN | 1672164 A | 9/2005 |
| CN | 101001455 A | 7/2007 |
| CN | 2011074708 Y | 12/2008 |

(Continued)

OTHER PUBLICATIONS

Luo, et al., "Model-Based Segmentation and Tracking of Head-and-Shoulder Video Objects for Real Time Multimedia Services," IEEE Transactions on Multimedia, vol. 5, No. 3, Sep. 2003, pp. 379-389.

(Continued)

*Primary Examiner* — Binh Tieu
(74) *Attorney, Agent, or Firm* — Conley Rose, P.C.; Grant Rodolph; Jonathan K. Polk (57) ABSTRACT

An apparatus comprises a processor configured to: process, automatically and in real time, segmentation of a video object from a portion of a video, wherein the video object is a foreground of the video, and wherein a remaining portion of the video is a background of the video; and remove the background.

28 Claims, 4 Drawing Sheets

(56) References Cited

FOREIGN PATENT DOCUMENTS

| CN | 101510957 A | 8/2009 |
|---|---|---|
| CN | 101753851 A | 6/2010 |
| CN | 101917313 A | 12/2010 |

OTHER PUBLICATIONS

Achanta, et al., "SLIC Superpixels*," EPFL Technical Report 149300, Jun. 2010, 15 pages.

Yuan, et al., "Automatic Segmentation of Head-and-Shoulder Images by Combining Edge Feature and Shape Prior," 2011 12th International Conference on Computer-Aided Design and Computer Graphics, 2011, 8 pages.

Gregory Cook, et al., "Image Transform Zero Coefficient Selection and Zero-Skip Transmission for Arbitrary Shape Transform Coding," U.S. Appl. No. 13/495,864, filed Jun. 13, 2012, 62 pages.

Foreign Communication From a Counterpart Application, PCT Application No. PCT/CN2014/073274, International Search Report dated Jun. 30, 2014, 4 pages.

Foreign Communication From a Counterpart Application, PCT Application No. PCT/CN2014/073274, Written Opinion dated Jun. 30, 2014, 3 pages.

Skype for Android, https://web.archive.org/20130311054545/http://www.skype.conn/intl/en-us-get-skype/on-your-mobile/download/skype-for-android/, downloaded from the Internet Jan. 14, 2015, 3 pages.

"Telepresence/Video Communications," Huawei Telepresence Systems: https//web.archive.org/web/20130301025206/http://enterprise.huawei.com/us/products/coll-communication/telepresence-videoconference/index.htm, downloaded from the Internet Jan. 14, 2015, 4 pages.

* cited by examiner

┌─────────────────────────────────────────────┐
│ PROCESS, AUTOMATICALLY AND IN REAL TIME, SEMENTATION │
│ OF A VIDEO OBJECT FROM A PORTION OF A VIDEO, WHEREIN │──410
│ THE VIDEO OBJECT IS A FOREGROUND OF THE VIDEO, AND │
│ WHEREIN A REMAINING PORTION OF THE VIDEO IS A │
│ BACKGROUND OF THE VIDEO │
└─────────────────────────────────────────────┘
                        │
                        ▼
┌─────────────────────────────────────────────┐
│ REPLACE THE BACKGROUND WITH A NEW BACKGROUND │──420
└─────────────────────────────────────────────┘

AUGMENTED VIDEO CALLS ON MOBILE DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The advancement of mobile devices and the growth of fourth-generation (4G) Long Term Evolution (LTE), a wireless communication standard, has provided for mobile video telephony, which allows users to communicate when and where they want by video with other users. Such communication may be referred to as video calling or video conferencing. Video calling may provide multi-way, interactive audio and video communication between two parties or among more than two parties to create an immersive experience meant to simulate an in-person meeting.

The amount of data needed to depict even a short video segment during such a video call may be substantial, resulting in difficulties when the data is communicated across a network with limited bandwidth capacity. Video may therefore be compressed via video compression hardware or software on a device that is the source of the video. The compression may be part of an encoding process prior to the video stream being communicated across the network, which decreases the quantity of data needed to communicate the video. Video may then be decompressed via video decompression hardware or software on a device that is the receiver of the video as part of a decoding process. Improved compression and decompression techniques may increase compression ratios, and thus reduce the amount of data necessary to communicate video without substantially reducing video quality.

SUMMARY

In one embodiment, the disclosure includes an apparatus comprising a processor configured to: process, automatically and in real time, segmentation of a video object from a portion of a video, wherein the video object is a foreground of the video, and wherein a remaining portion of the video is a background of the video; and remove the background.

In another embodiment, the disclosure includes an apparatus comprising a receiver configured to: receive an encoded video object, wherein the encoded video object represents a video object, wherein the video object was, during a segmentation, segmented from a portion of a video, wherein the video object was a foreground of the video, wherein a remaining portion of the video was a background of the video, and wherein the background was removed from the video; and receive an encoded mask, wherein the encoded mask represents a mask, and wherein the mask identifies a location of the background; and a processor coupled to the receiver and configured to: decode the encoded video object; decode the encoded mask; and determine the location of the background based on the mask.

In yet another embodiment, the disclosure includes a method comprising processing, automatically and in real time, segmentation of a video object from a portion of a video, wherein the video object is a foreground of the video, and wherein a remaining portion of the video is a background of the video; and replacing the background with a new background.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

First, current mobile video technologies may consume a relatively smaller amount of bandwidth compared to potential mobile video technologies. For example, while video calls between two mobile devices using Skype™ for Android™ may consume an average of 500 kilobits per second (Kb/s), high-definition (HD) video calls may consume an average of 2-4 megabits per second (Mb/s). While current mobile devices may employ a Video Graphics Array (VGA) resolution (e.g., 640×480 pixel resolution) for video, higher resolutions may soon be employed. Accordingly, there may be a need for more bandwidth to support, and improved processors to compress, such higher-resolution video. In addition, instead of transmitting the entirety of each video frame during a video call, each frame may be analyzed to determine important portions of the video, such as a participant's head-shoulder area (e.g., the foreground of the video), to transmit. Transmitting only such important regions may reduce the amount of data needed to transmit the video call. In particular, if the portion of the video other than the foreground (e.g., the background of the video) is noisy or has an appreciable amount of motion, then the background may require complex compression and encoding. Removing the background may therefore result in a significant reduction in the amount of data needed to transmit the video and thus ensure smoother video calling, particularly when the video call occurs over a network with limited bandwidth (e.g., a third generation network) or when the participants have wireless contracts providing for a limited amount of data. In addition, the background may be replaced with a new background at a receiver without any data transmission of the background.

Second, some non-mobile video call solutions, such as Huawei™ immersive telepresence systems, may provide a combination of high-end hardware, software, environmental design, reliability, service, and support to ensure an easy-to-use, immersive, and high-quality video call. The video call may feel immersive by providing a designed environment for a background that is consistent among video call participants. Such a video call may be difficult to replicate with limited resources, for example, on mobile devices communicating across a wireless network. Removing the background from mobile video calls may therefore provide a consistent, immersive experience for participants without the need for high-end resources available with non-mobile solutions. The background may also be replaced with a background shared by all participants. Furthermore, the background may be replaced only locally (e.g., on the sending device) for entertainment or other purposes.

Third, a video call participant may desire not to share with other participants everything that a camera may capture. For example, the participant may desire not to share anything else but the foreground because confidential items may be present in the background or the background may disclose the participant's location. Removing or replacing the background from mobile video calls may therefore provide a confidential video call.

The above three issues, namely video quality, user experience, and privacy, may provide impediments to mobile video calling. Current segmentation techniques may exhibit slow processing, rendering those techniques unsuitable for real time. In addition, those techniques may require a trade-off between video quality and data rate transmission. To address those issues, the described embodiments may provide for, automatically and in real time, segmenting a foreground of a video and replacing the background of the video with a new background. Such a process can improve video quality, user experience, and privacy while being computationally inexpensive, being suitable for mobile devices, and requiring less data transmission. The described embodiments are not limited to mobile devices, but may be applied to non-mobile devices as well.

Figure 1:
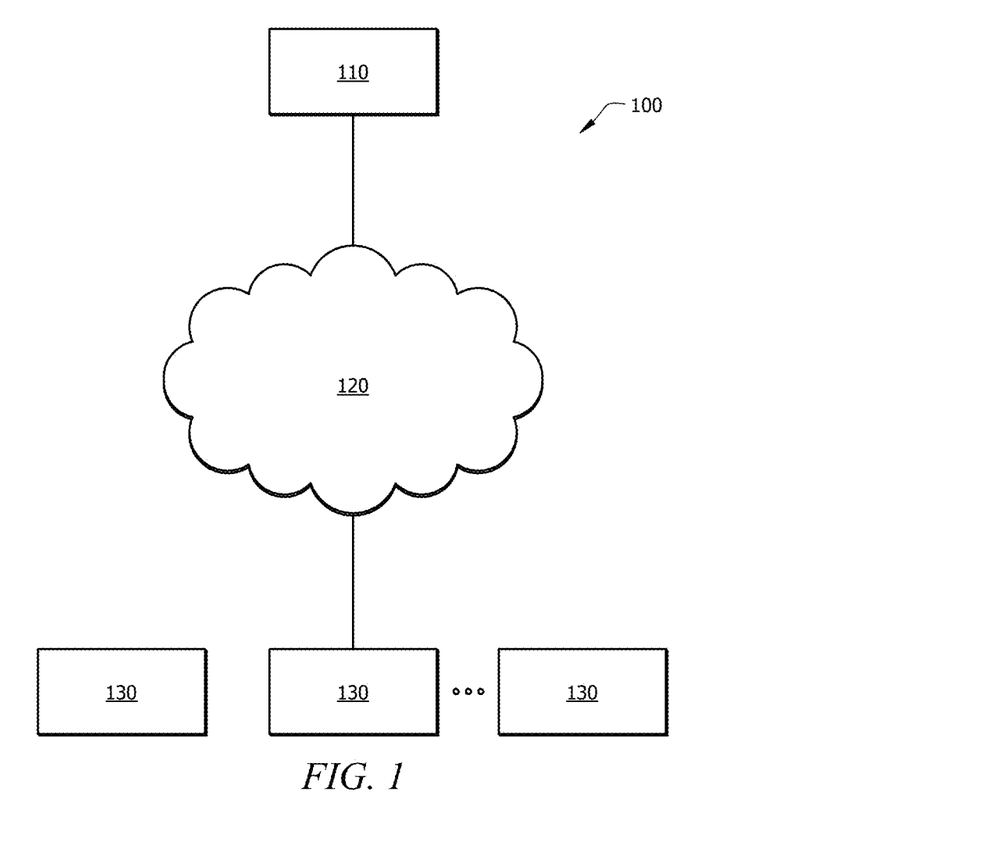
FIG. 1 is a schematic diagram of a communication system in accordance with an embodiment of the disclosure.

FIG. 1 is a schematic diagram of a communication system 100. The communication system 100 may comprise a primary device 110 communicatively coupled to a plurality of secondary devices 130 via a network 120. The primary device 110 may be a mobile phone, tablet computer, or other device. Each of the secondary devices 130 may likewise be a mobile phone, tablet computer, or other device. The network 120 may be the Internet, a wireless mobile phone network, or another network.

The primary device 110 may participate in a video call with at least one of the secondary devices 130. The primary device 110 and each of the participating secondary devices 130 may transmit and receive data to participate in the video call. For example, the primary device 110 may capture data via a camera (not shown), encode the data, and transmit the encoded data to the participating secondary devices 130. At the same time, the primary device 110 may receive encoded data from the participating secondary devices 130 and decode that received data. The primary device 110 and each of the secondary devices 130 may perform the above tasks and the tasks described below through any combination of hardware and software.

Figure 2:
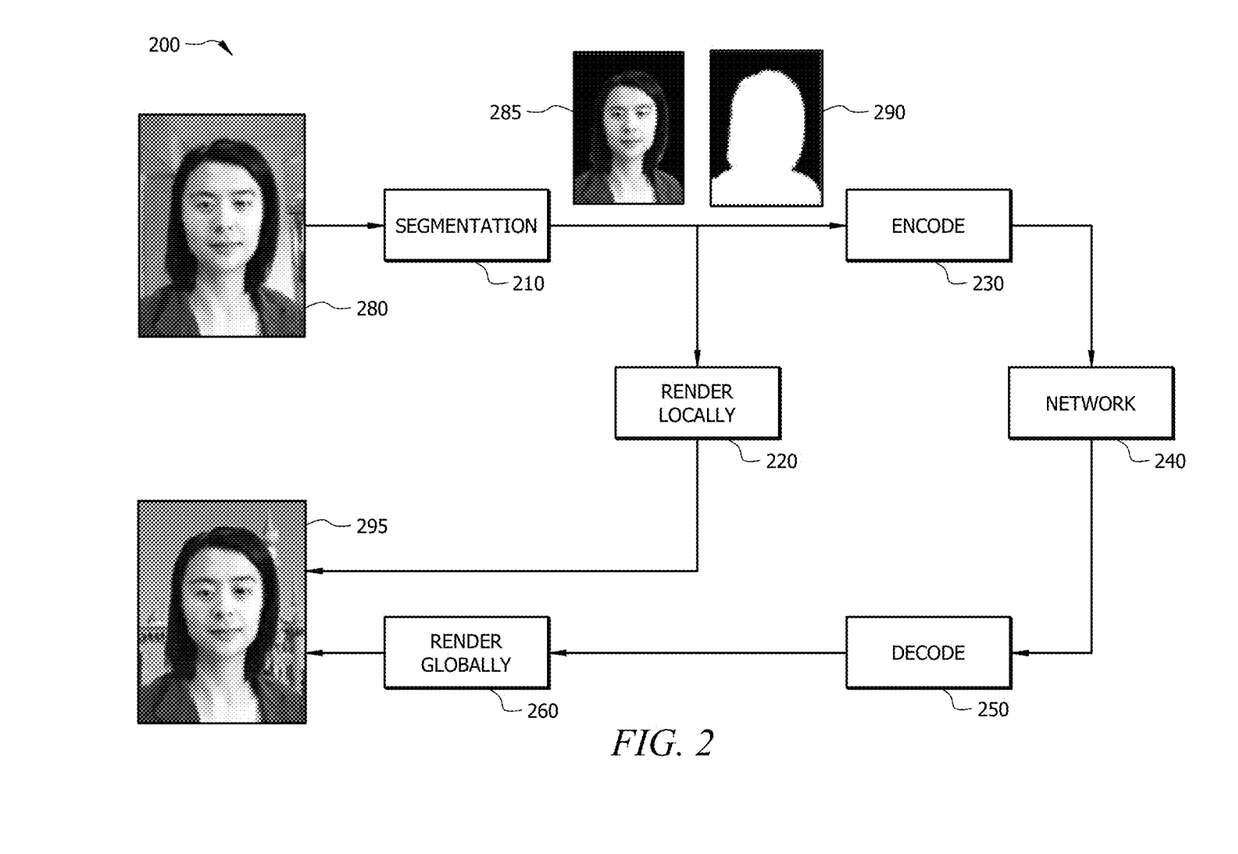
FIG. 2 is a flowchart illustrating a process for producing a final video frame from an initial video frame in accordance with an embodiment of the disclosure.

FIG. 2 is a flowchart illustrating a process 200 for producing a final video frame 295 from an initial video frame 280. The process 200 may begin with the initial video frame 280. The camera (not shown) associated with the primary device 110 may capture a sequence of video frames in relatively quick succession, thereby causing a viewer to perceive motion. Typically, each of the video frames is at least slightly different from the other video frames. When that is the case, the video may be said to be dynamic. One of those video frames may be the initial video frame 280, which shows a head-shoulder region of a female (e.g., foreground) along with a background.

At step 210, the primary device 110 may segment the initial video frame 280. Segmentation may refer to partitioning of the initial video frame 280 into multiple sets of pixels. For example, segmentation may comprise partitioning out the foreground of the initial video frame 280 from the rest of the initial video frame 280. The segmented portion, in this case the foreground, may be referred to as a video object. Segmentation may result in two rectangular frames associated with the video object. The first rectangular frame may be a color frame 285, which may comprise the video object's color information and thus the video object itself. A second rectangular frame may be a mask 290, which may comprise binary data indicating which pixels in the color frame 285 correspond to the video object. For example, a binary 1 may indicate a location of the video object and a binary 0 may indicate a location of the background. The segmentation may occur automatically and in real time.

At step 220, the primary device 110 may locally render the final video frame 295. Rendering may refer to the process of generating the final video frame 295. Locally may mean that the final video frame 295 is rendered on the primary device 110 instead of on another device. The primary device 110 may determine a location of the background of the initial video frame 280 via the mask 290 and replace the background with a new background. The new background may be an image or a video. In this case, the final video frame 295 shows a city landscape as the new background. As a result, while the video object may be dynamic, the background may remain static and continue to show the city landscape as each frame is captured and displayed on the primary device 110. The primary device 110 may also determine a location of the foreground of the initial video frame 280 via the mask 290. After completing those steps, the primary device 110 may render the final video frame 295 by combining the foreground and the new background. The local rendering may occur automatically and in real time.

Alternatively or in combination with locally rendering at step 220, at least one of the secondary devices 130 may globally render the final video frame 295. Globally may mean that the final video frame 295 is rendered on at least one device other than the primary device 110, in this case, one of the secondary devices 130. The process of global rendering may begin at step 230 where the primary device 110 may encode the color frame 285 using a motion-compensated video codec and may encode the mask 290 using a binary codec. The codecs may be well-known in the art. A codec may refer to any combination of hardware and software capable of encoding and decoding data. The global rendering may occur automatically and in real time.

For the color frame 285, the primary device 110 may improve coding efficiency by choosing any color value for the masked (e.g., black) background pixels that will generate the least number of bits with the color frame 285 encoded as a regular rectangular frame. Conventional coding specifications such as H.264/Advanced Video Coding (AVC) or VP8, which are incorporated by reference as if reproduced in their entirety, assume rectangular coding blocks, may be applied to encode pure foreground blocks and pure background blocks. For boundary blocks containing both foreground and background pixels, the primary device 110 may use low complexity arbitrary shape encoding to improve coding efficiency. Low complexity arbitrary shape encoding is described in "Image Transform Zero Coefficient Selection and Zero-Skip Transmission for Arbitrary Shape Transform Coding," Gregory Cook, et al., U.S. patent application Ser. No. 13/495,864, which is incorporated by reference as if reproduced in its entirety.

At step 240, the primary device 110 may transmit the encoded color frame and the encoded mask to the receiving secondary devices 130 via the network 240. The network 240 may be the same as the network 120. Each of the receiving secondary devices 130 may then receive the encoded color frame and the encoded mask At step 250, the receiving secondary devices 130 may decode the encoded color frame and the encoded mask to obtain the color frame 285 and the mask 290. The receiving secondary devices 130 may perform the decoding using the same codecs that the primary device 110 used to encode the color frame 285 and mask 290.

At step 260, the receiving secondary devices 130 may globally render the final video frame 295. The receiving secondary devices 130 may determine the location of the foreground and the background of the initial video frame 280 via the mask 290. The receiving secondary devices 130 may replace the background with a new background. The receiving secondary devices 130 may choose the new background or may receive the new background from the primary device 110. In the latter case, the primary device 110 may embed the new background into the mask 290 by using a numerical indicator. The new background may be the same as another background associated with at least one of the receiving secondary devices 130. After completing those steps, the receiving secondary devices 130 may render the final video frame 295 by combining the foreground and the new background.

Figure 3:
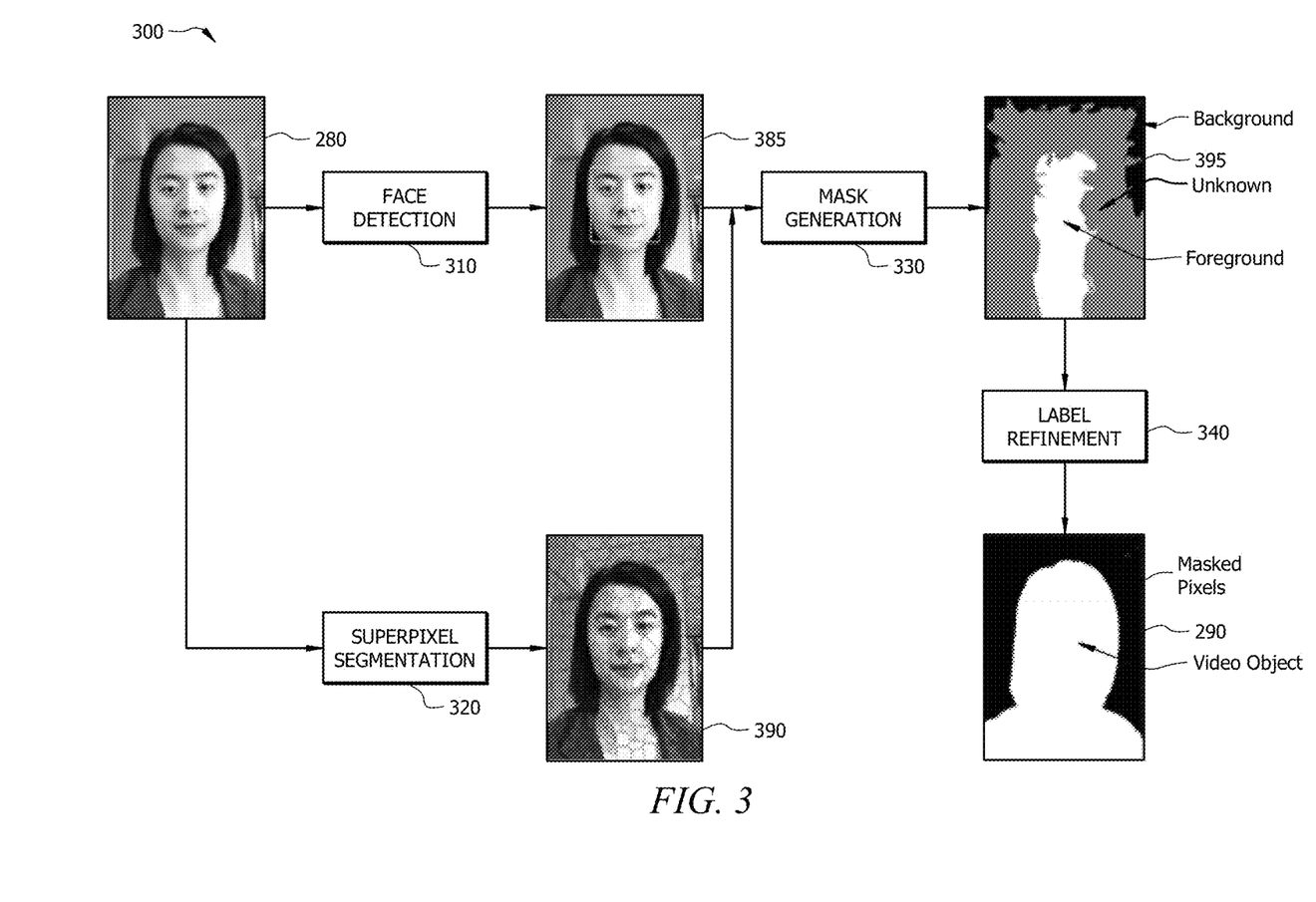
FIG. 3 is a flowchart illustrating a process for segmenting a video object from a video frame in accordance with an embodiment of the disclosure.

FIG. 3 is a flowchart illustrating a process 300 for segmenting a video object from a video frame. The process 300 may be suitable for the segmentation step 210 in FIG. 2. The process 300 may begin with the initial video frame 280. At step 310, the primary device 110 may perform face detection of the initial video frame 280. Alternatively, the primary device 110 may perform head-shoulder or other detection. The various detection processes may be well-known in the art. In the case of face detection, the primary device 110 may analyze the pixels in order to determine an initial detected face region of the video object. The initial detected face location may be marked by a rectangle or other geometric shape as shown in a face detection video frame 385.

At step 320, the primary device 110 may perform superpixel segmentation, which may comprise grouping the pixels in the initial video frame 280 into perceptually meaningful small regions, which adhere well to image boundaries. For example, simple linear iterative clustering (SLIC) may be used. SLIC is a superpixel algorithm that adapts a k-means clustering approach to generate superpixels as shown in a superpixel video frame 390. SLIC is described in "SLIC Superpixels," Radhakrishna Achanta, et al., EPFL Technical Report 149300, 2010, which is incorporated by reference as if reproduced in its entirety.

At step 330, the primary device 110 may generate an initial mask 395 based on an analysis of the face detection video frame 385 and the superpixel video frame 390. The initial mask 395 may comprise white, gray, and black portions. The white portions may correspond to a known foreground, the black portions may correspond to a known background, and the gray portions may correspond to an unknown region. The primary device 110 may determine which superpixels from the superpixel video frame 390 largely overlap with the initial detected face region from the face detection video frame 385. Those superpixels and the superpixels that extend to the bottom of the superpixel video frame 390 may be considered the known foreground and may be colored white. The primary device 110 may then determine which superpixels from the superpixel video frame 390 are mostly along the boundary of the top half of the initial video frame 280 and are thus known background. Those superpixels may be considered the known background and may be colored black. The primary device 110 may then determine that all remaining superpixels from the superpixel video frame 390 are in the unknown region and assign a gray color to them.

At step 340, the primary device 110 may perform label refinement, which may comprise progressively re-designating each superpixel from the unknown region to either the known foreground or the known background so that the mask 290 comprises superpixels with either a foreground or background label. The label refinement may be based on two criteria, the color distance between each superpixel and its neighbors and the number of pixels they share as neighbors. The primary device 110 may compute the average color in CIELAB color space for each superpixel. The primary device 110 may then use the Euclidean distance to measure the color distance between two adjacent superpixels.

The primary device 110 may then perform an iterative process based on the number of neighboring pixels shared between superpixels. For a given number of shared neighboring pixels, the primary device 110 may sort from smallest to largest a list of color distances between unknown superpixels and their neighbors. For the unknown superpixel with the smallest color distance to a neighboring known superpixel, the primary device 110 may assign the label (foreground or background) belonging to the known superpixel to the unknown superpixel as well. The primary device 110 continues to the pair with the next smallest color distance and so on. Once the primary device 110 finishes the current list, the number of shared neighboring pixels is decreased by half, and the primary device 110 may construct another such list. The primary device 110 may continue in that manner until it labels each superpixel as either foreground or background. After assigning labels to each superpixel, the primary device 110 may generate the mask 290.

Figure 4:
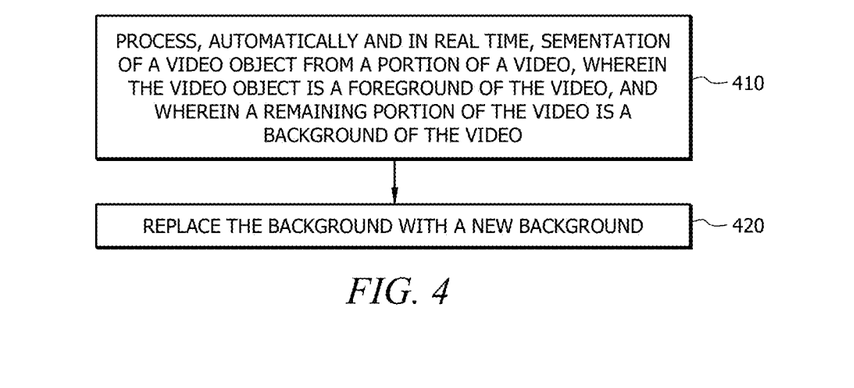
FIG. 4 is a flowchart illustrating a method in accordance with an embodiment of the disclosure.

FIG. 4 is a flowchart illustrating a method 400 according to the disclosure. The method 400 may be implemented on the primary device 110. At step 410, segmentation of a video object from a portion of a video may be processed automatically and in real time. The segmentation may be the same as described above in step 210 of FIG. 2 and steps 310 to 340 of FIG. 3. The portion of the video may be the initial video frame 280. The video object may be the foreground of the video, and the remaining portion of the video may be the background of the video. At step 420, the background may be replaced with a new background.

Figure 5:
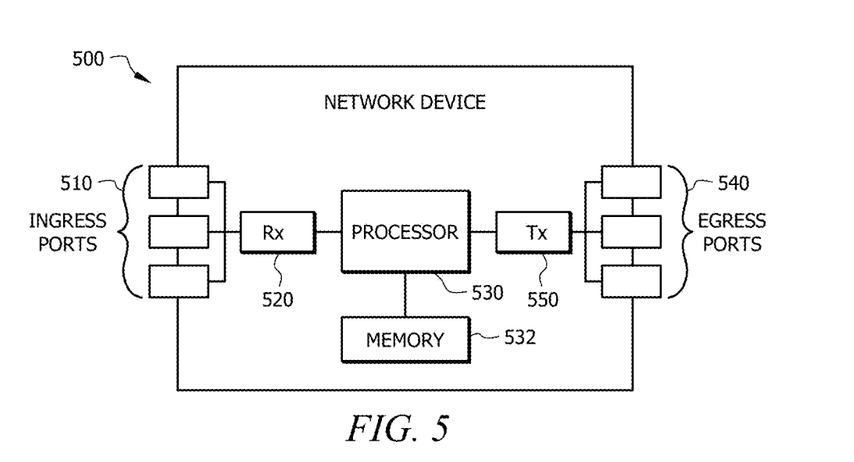
FIG. 5 is a schematic diagram of a network device in accordance with an embodiment of the disclosure.

FIG. 5 is a schematic diagram of a network device 500 according to an embodiment of the disclosure. The network device 500 may comprise a plurality of ingress ports 510 and/or receiver units (Rx) 520 for receiving data, a processor or logic unit 530 to process signals, a plurality of egress ports 540 and/or transmitter units (Tx) 550 for transmitting data to other components, and a memory 532. The network device 500 may be suitable for implementing the features, methods, and devices described above, including the primary device 110 and the secondary devices 130 illustrated in FIG. 1 and described in the disclosure.

The processor 530 (which may be referred to as a central processor unit, or CPU) may be in communication with the ingress ports 510, receiver units 520, egress ports 540, transmitter units 550, and memory 532. The processor 530 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs.

The memory 532 may be comprised of one or more disk drives or tape drives, may be used for non-volatile storage of data and as an over-flow data storage device, may be used to store programs when such programs are selected for execution, and may be used to store instructions and perhaps data that are read during program execution. The memory 532 may be volatile and/or non-volatile and may be read only memory (ROM) and/or random access memory (RAM).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a memory; and
   a processor coupled to the memory and configured to:
   process, automatically and in real time, segmentation of a video object from a portion of a video, wherein the video object is a foreground of the video, wherein a remaining portion of the video is a background of the video, and wherein the segmentation comprises label refinement based on average color distances between superpixels and on amounts of neighboring superpixels shared between the superpixels; and
   remove the background.

2. The apparatus of claim 1, wherein the segmentation further comprises object detection, superpixel clustering, and mask generation.

3. The apparatus of claim 2, wherein the object detection is based on either head-shoulder detection or face detection.

4. The apparatus of claim 2, wherein the superpixel clustering is based on Simple Linear Iterative Clustering (SLIC).

5. The apparatus of claim 2, wherein the mask generation is based on an initial mask comprising a white color, a black color, and a gray color, wherein the white color corresponds to an area of the video that is readily identified as the foreground, wherein the black color corresponds to an area of the video that is readily identified as the background, and wherein the gray color corresponds to an area of the video that cannot be readily identified as either the foreground or the background.

6. The apparatus of claim 1, wherein the processor is further configured to replace the background with a new background.

7. The apparatus of claim 6, wherein the processor is further configured to generate a mask and embed the new background into the mask using a numerical indicator.

8. The apparatus of claim 6, wherein the processor is further configured to:
   encode the video object; and
   transmit the encoded video object.

9. The apparatus of claim 6, wherein the new background is an image.

10. The apparatus of claim 6, wherein the new background is a video.

11. The apparatus of claim 6, wherein the new background is the same as another background associated with another apparatus.

12. The apparatus of claim 1, wherein the video object is a head-shoulder region of a person or a face region of the person.

13. An apparatus comprising:
a receiver configured to:
receive an encoded video object, wherein the encoded video object represents a video object, wherein the video object was segmented from a portion of a video, wherein the video object was a foreground of the video, wherein a remaining portion of the video was a background of the video, and wherein the background was removed from the video;
receive an encoded mask, wherein the encoded mask represents a mask, identifies a location of the background, and comprises a new background that is embedded using a numerical indicator; and
extract the new background from the encoded mask; and
a processor coupled to the receiver and configured to:
decode the encoded video object;
decode the encoded mask; and
determine the location of the background based on the mask.

14. The apparatus of claim 13, wherein the segmentation comprised object detection, superpixel clustering, mask generation, and label refinement.

15. The apparatus of claim 14, wherein the object detection was based on either head-shoulder detection or face detection.

16. The apparatus of claim 14, wherein the superpixel clustering was based on Simple Linear Iterative Clustering (SLIC).

17. The apparatus of claim 14, wherein the mask generation was based on an initial mask comprising a white color, a black color, and a gray color.

18. The apparatus of claim 17, wherein the white color corresponded to an area of the video that was readily identified as the foreground, wherein the black color corresponded to an area of the video that was readily identified as the background, and wherein the gray color corresponded to an area of the video that could not be readily identified as either the foreground or the background.

19. The apparatus of claim 14, wherein the label refinement was based on average color distances between superpixels and on amounts of neighboring pixels shared between the superpixels.

20. The apparatus of claim 13, wherein the processor is further configured to replace the background with the new background.

21. The apparatus of claim 20, wherein the new background is the same as another background associated with the apparatus.

22. A method comprising:
processing, automatically and in real time, segmentation of a video object from a portion of a video, wherein the video object is a foreground of the video, wherein a remaining portion of the video is a background of the video, and wherein the segmentation comprises label refinement based on average color distances between superpixels and on amounts of neighboring superpixels shared between the superpixels; and
replacing the background with a new background.

23. The method of claim 22, wherein the segmentation further comprises object detection, superpixel clustering, and mask generation.

24. The method of claim 23, wherein the object detection is based on either head-shoulder detection or face detection.

25. The method of claim 23, wherein the superpixel clustering is based on Simple Linear Iterative Clustering (SLIC).

26. The method of claim 23, wherein the mask generation is based on an initial mask comprising a white color, a black color, and a gray color.

27. The method of claim 26, wherein the white color corresponds to an area of the video that is readily identified as the foreground, wherein the black color corresponds to an area of the video that is readily identified as the background, and wherein the gray color corresponds to an area of the video that cannot be readily identified as either the foreground or the background.

28. The method of claim 22, further comprising:
generating a mask; and
embedding a new background into the mask using a numerical indicator.

* * * * *